(12) United States Patent
Rott et al.

(10) Patent No.: US 6,212,286 B1
(45) Date of Patent: Apr. 3, 2001

(54) METHOD FOR NON-INVASIVE AND SAFE TESTING OF TELECOMMUNICATION AND BROADCAST TOWERS OR OTHER AIRWAVE OR CABLE TRANSMITTING AND RECEIVING DEVICES

(76) Inventors: John Edward Rott; Catherine Irene Rott, both of 3010 Ewing La., El Reno, OK (US) 73036

( * ) Notice: Subject to any disclaimer, the term of this patent is extended or adjusted under 35 U.S.C. 154(b) by 0 days.

(21) Appl. No.: 09/157,281

(22) Filed: Sep. 18, 1998

(51) Int. Cl.[7] .................................................. G06K 9/00
(52) U.S. Cl. ............................ 382/100; 384/164; 324/96
(58) Field of Search ........................ 382/100, 1; 701/213; 358/113; 324/96; 348/164

(56) References Cited

U.S. PATENT DOCUMENTS

| | | | | |
|---|---|---|---|---|
| 4,584,523 | * | 4/1986 | Elabd | 324/96 |
| 4,852,182 | * | 7/1989 | Herbin et al. | 382/1 |
| 4,910,593 | * | 3/1990 | Weil | 358/113 |
| 5,826,212 | * | 10/1998 | Nagai | 701/208 |
| 6,055,478 | * | 4/2000 | Heron | 701/213 |

* cited by examiner

Primary Examiner—Joseph Mancuso
Assistant Examiner—A- Tabatabai
(74) Attorney, Agent, or Firm—Randal D. Homburg

(57) ABSTRACT

This invention is a method for the non-invasive and safe testing of telecommunication and broadcast towers or other airwave or cable transmitting and receiving devices and related equipment using a calibrated infrared camera and computer, computer software, a color monitor or a color printer. This novel method of testing and determination of potential problem sites and failure prediction can be conducted from ground level and at some distance from the tower or device being tested, substantially reducing the risk of falling from extreme heights or being exposed to hazardous EMF fields, microwave or RF transmission waves, all of which are fatal or hazardous to health of the person conducting the testing. Additionally, this method is conducted while the tower of device is full and dynamic operation, and does not require the tower or device to be shut down or inoperable during the test, and also allows for the transmitting and receiving devices to be adjusted while in operation without invasion or disassembly of the tested device.

8 Claims, 1 Drawing Sheet

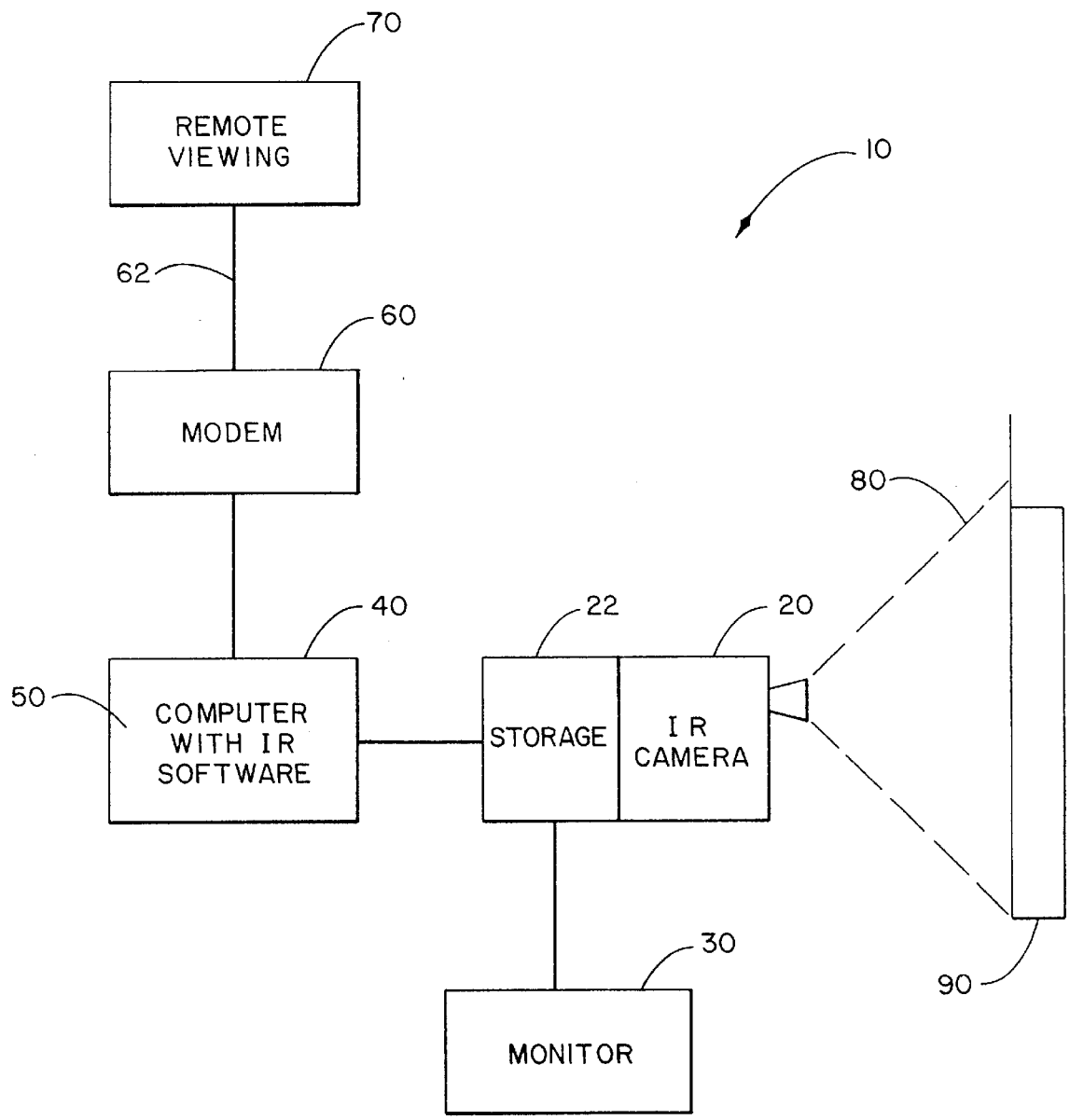

METHOD FOR NON-INVASIVE AND SAFE TESTING OF TELECOMMUNICATION AND BROADCAST TOWERS OR OTHER AIRWAVE OR CABLE TRANSMITTING AND RECEIVING DEVICES

BACKGROUND OF INVENTION

1. Field of the Invention

This invention is a method for the non-invasive and safe testing of telecommunication and broadcast towers or other airwave or cable transmitting and receiving devices and related equipment using a calibrated infrared camera, computer software and either a color monitor or color printer. This novel method of testing and determination of potential problem sites and failure prediction is conducted from ground level and at some distance from the tower or device being tested, substantially reducing the risk of falling from extreme heights or being exposed to hazardous EMF fields, microwave or RF transmission waves, all of which are fatal or hazardous to health of the person conducting the testing. Additionally, this method is conducted while the tower of device is in full and dynamic operation, and does not require the tower or device to be shut down or inoperable during the test, and also allows for the transmitting and receiving devices to be adjusted while in operation without invasion or disassembly of the tested device.

2. Description of Prior Art

Infrared technology has existed for some time and the equipment needed for the use of this method is readily available and currently on the market. However, it does not appear that utilization of the technology or equipment is being applied to the testing as described in this method invention.

In U.S. Pat. No. 5,751,830, incorporated herein by reference, and apparatus and method is disclosed for ranging spectroscopy and thermal imaging using a combinate heterodyne detection and active laser or passive local oscillator radiation to produce a three-dimensional or holographic image of a target scene used for pollution study, weather detection or military weapon targeting. In U.S. Pat. No. 5,737,119, also incorporated herein by reference, a thermal imaging device receives thermal infrared radiation from a viewed scene and provides a visible image of the viewed scene. An infrared focal plane array detecting device which records, displays and photographs infrared images by conversion of infrared images by electronic conversion of infrared images to infrared radiation using a light-emitting apparatus is disclosed in U.S. Pat. No. 5,710,428, herein incorporated by reference. A process for thermal image detection of the integrity of bonds between epoxy patches and aircraft structural materials is disclosed in U.S. Pat. No. 4,709,469, and is incorporated herein by reference.

A fluorescent microthermal imaging apparatus and method for integrated circuit failure analysis using a laser to excite a thin fluorescent film disposed over the surface of an integrated circuit is disclosed in U.S. Pat. No. 5,705,821, and is incorporated herein by reference. Thermal imaging devices are disclosed in U.S. Pat. Nos. 5,682,035 and 5,663,562, incorporated herein by reference, the first device used in very bright light, such as a fire, with the capability of clear display of a much darker contrast area, such as a dark background of a night sky. In U.S. Pat. No. 5,493,118, incorporated herein by reference, a thermal detection system having a pyroelectric thermal detection element is disclosed.

SUMMARY OF THE INVENTION

On Oct. 15, 1997, the Telecommunications Act of 1996, Section 704 went into effect concerning exposure to radio frequency or RF radiation. The general public is not aware of the implications of the law or the health risks presented in exposure to this RF radiation or the exposure to other broadcast or telecast radiation. The FCC and OSHA are primarily responsible for the enforcement and protection of the public who may be exposed to the varied levels of exposure to telecommunication radiation, and it is anticipated that this method invention would be a valuable means of protecting not only persons responsible for the care and maintenance of telecommunication equipment, but to those person who reside or work within close proximity to telecommunication transmission and receiving devices, thus assisting greatly in compliance with the 1996 Telecommunication Act, and other safety promoting acts and legislation relative to the telecommunications industries.

This invention is a method for conducting the thermal infrared scan of communication and broadcast equipment, towers, guy wires, cables, optical fiber cable and antenna systems for energy in the long wave (8 um to 12 um) and/or short wave (3.4 um to 5 um) ranges, or other communications wavelengths. The method utilizes existing manufactured equipment, and can be analyzed by various differing means. An infrared camera gives a real time display of the equipment being scanned, and the display can be viewed onboard the camera, on an adjacent monitor, or relayed to an external local computer or to a distant computer and monitor via modem. The real time display may also be sent via modem to any remote location by telephone line or satellite transmission link anywhere around the globe.

The included methods are non-invasive and fully dynamic, thus allowing a full power system test giving an operational analysis of said systems. The methods are also useful in the EMF analysis of tower locations by locating malfunctioning equipment which effects the radiation patterns of the broadcast or telecast systems under analysis, which is especially critical with the overwhelming increase in the use of cellular and PCS technology and use expanding into local neighborhoods, increasing the human exposure to harmful EMF energy.

The methods included in the invention employ the used of an adjustably calibrated infrared camera, such as the Inframetrics ThermaCAM™ SC1000 FPA IR Radiometer, which is aimed at telecommunication and broadcast towers or other airwave transmitting and receiving devices, and calibrated to detect the requires subtle heat differential of the components. The camera should have a sensitivity and capability of calibration at least to the nearest 0.1 degree temperature differential. The scan method may be accomplished from the ground, for short towers, a helicopter for extremely tall towers, or even on board the tower on an internal elevator, although the safety benefit of distant testing is substantially negated using this on board testing option. Once the scanning is competed, it can be analyzed by software allowing the viewed image to be modified for best presentation.

DESCRIPTION OF THE DRAWINGS

The following drawings are informal drawings submitted with this provisional patent application.

FIG. 1 is a schematic drawing of the inventive method of non-invasive and safe testing of telecommunication and broadcast towers or other airwave or cable transmitting and receiving devices and related equipment using a calibrated infrared camera, including the several embodiments of the method, showing the infrared camera, its onboard storage means, an attached color monitor, an attached computer having interpretive IR software included, or attached to a modem for transmission to any remote location by telephone line or satellite transmission link anywhere around the globe.

DESCRIPTION OF THE PREFERRED EMBODIMENT

The test is generally suited for testing of energy in the long wave (8 um to 12 um) and/or short wave (3.4 um to 5 um) ranges. However, use in any telecommunication application may be utilized by the disclosed and claimed methods. In all methods disclosed in the invention, it is first advisable to train the test personnel in the use of the equipment, as the equipment used in the disclosed methods is very expensive and, though relatively user friendly, require some training and experience to optimize test accuracy and data analysis.

In contrast to known and existing uses of infrared scanning or testing, a first method 10 employs an adjustably calibrated infrared camera 20, such as the Inframetrics ThermaCAM™ SC1000 FPA IR Radiometer, operated as a stand alone camera to record the test of the targeted equipment or target object 90. The adjustably calibrated infrared camera is aimed and focused on the test object and the reflected thermal image 80 of the test object is gathered by the camera and the camera is calibrated and adjusted to optimize the recording of the data. The camera is preferably of the type which includes a means 22 to digitally store and record the test, including a floppy disk or a PCMCIA card which can be later inserted into a PC computer 40. The recorded images are downloaded onto a computer 40 and transformed into a visible image either on a computer monitor or to a color printer for two-dimensional thermal representation of the tested device.

The method of testing is conducted from a distance to insure safety, and the user simply operates the camera during this test method. This method is most useful in the testing of transmission and broadcast towers of substantial height, where the user, by employing the assistance of a helicopter, can shoot the entire height of the tower holding only the camera, and making several top to bottom passes around the transmission tower. This method reduces the safety risks to the user who, prior to this method, was required to climb the transmission tower and test the tower using hand-held testing devices while attempting to maintain hold on the tower. Additionally, being able to test the tower from a distance, the user is not exposed to high levels of RF waves, microwaves or electro-magnetic field, and will not be required to don heavy and restrictive protective gear in order to safely perform the test.

In a second method 10, the IR camera 20 is used as a dedicated real-time digital component and is connected directly to a color monitor 30 for viewing of the thermal image at the time of testing. This second method is most useful for the testing and fine-tuning adjustment of RF transmitting devices, such as an RF circulator, RF connector, cable equipment or optical fiber cable and connections without having to invade the cavity of the tested device, disconnect the device from a power source, or interrupt the integrity of the cable or optical fiber line, or requiring complete or partial shut-down of the operation of the test equipment during testing.

Again the adjustably calibrated infrared camera 20 is aimed at the test object 90, and using this method, the camera is preferably mounted on a tripod for stability of recording and steadiness of readout of the thermal image 80 of the test object 90. This also allows the user to have his hands free to adjust the equipment and the camera as needed during the testing procedure.

In a third method 10, the IR camera 20 is again used as a dedicated real-time digital component and is connected to a PC computer 40, having been programmed with digital imaging software 50, such as the ThermoGRAM® PRO for Windows™ or TherMonitor 95 Lite®. Using this combination of components and computer software, or other suitable substitute, the user may record the data for immediate interpretation, analysis and compilation, store and record the data within the computer hard drive or computer recording medium, or may immediately transmit the thermal imaging via computer transmission means 60 to a remote viewing site 70 for analysis and compilation of the data on a different or additional computer. The adjustably calibrated infrared camera is again aimed and focused on the test object 90 and the reflected thermal image 80 of the test object is gathered by the camera and the camera is calibrated and adjusted to optimize the recording of the data.

In this method 10, the user or person conducting the testing and recording of thermal imaging may have immediate consultation with a second party or multiple parties if so required, especially where the transmission is via modem 60 through telephone transmission lines or through PCS satellite link transmission 62.

What is claimed is:

1. A method for non-invasive and safe testing of telecommunication and broadcast towers or other airwave or cable transmitting and receiving devices, comprising the steps of:
   (a) training of test personnel on use of infrared technology, infrared equipment and infrared image interpretation;
   (b) targeting a desired dynamic and fully operational test object within a human visual means of an adjustably calibrated infrared camera operating as a stand alone camera to record the test of the targeted object from a safe distance;
   (c) calibrating the adjustably calibrated infrared camera to a desired infrared thermal recording spectra;
   (d) collecting and recording an infrared thermal image of the targeted object on a recording means within the adjustably calibrated infrared camera; and
   (e) translating the recorded infrared thermal image of the targeted object into a color representation of the thermal deviation of the components of the targeted object.

2. The method for non-invasive and safe testing of telecommunications and broadcast towers or other airwave or cable transmitting and receiving devices, as disclosed in claim 1, wherein the recording means within the adjustably calibrated infrared camera is a digital recording mechanism, such as a floppy disk or PCMCIA card, which can later be inserted into a PC computer.

3. The method for non-invasive and safe testing of telecommunication and broadcast towers or other airwave or cable transmitting and receiving devices, as disclosed in claim 1, wherein the adjustably calibrated camera is a digital camera.

4. A method for non-invasive and safe testing of telecommunication and broadcast towers or other airwave or cable transmitting and receiving devices, comprising the steps of:
   (a) training of test personnel on use of infrared technology, infrared equipment and infrared image interpretation;
   (b) targeting a desired dynamic and fully operational test object within a human visual means of an adjustably calibrated infrared camera operating as a dedicated real-time digital component from a safe distance;

(c) calibrating the adjustably calibrated infrared camera to a desired infrared thermal recording spectra; and (d) connecting the adjustably calibrated infrared camera to a color monitor for viewing of a visible color thermal image of the test object at the time of testing.

5. The method for non-invasive and safe testing of telecommunication and broadcast towers or other airwave or cable transmitting and receiving devices as disclosed in claim 4, wherein the method further comprising the steps of:

(e) fine-tuning and adjusting the test object; and (f) repeating steps (b) through (e) until the test object is adjusted to an optimum operating performance level.

6. A method for non-invasive and safe testing of telecommunication and broadcast towers or other airwave or cable transmitting and receiving devices, comprising the steps of:

(a) training of test personnel on use of infrared technology, infrared equipment and infrared image interpretation;

(b) targeting a desired dynamic and fully operational test object within a human visual means of an adjustably calibrated infrared camera operating as a dedicated real-time digital component from a safe distance;

(c) calibrating the adjustably calibrated infrared camera to a desired infrared thermal recording spectra;

(d) connecting the adjustably calibrated infrared camera to a PC computer having been programmed with digital imaging software;

(e) collecting and recording an infrared thermal image of the targeted object on the PC computer, and (f) using the computer digital imaging software, translating the recorded infrared thermal image of the targeted object into a color representation of the thermal deviation of the components of the targeted object.

7. The method for non-invasive and safe testing of telecommunication and broadcast towers or other airwave or cable transmitting and receiving devices as disclosed in claim 5, wherein the PC computer is also equipped with a modem for transmission of the infrared thermal image of the targeted object to a second computer at a remote location.

8. The method for non-invasive and safe testing of telecommunication and broadcast towers or other airwave or cable transmitting and receiving devices as disclosed in claim 5, wherein the computer digital imaging software is the type which may adjust and enhance the recorded infrared thermal image and recalibrate the infrared thermal spectra for differing spectral analysis.

* * * * *